United States Patent
Oktay et al.

(10) Patent No.: US 9,761,014 B2
(45) Date of Patent: Sep. 12, 2017

(54) SYSTEM AND METHOD FOR REGISTERING PRE-OPERATIVE AND INTRA-OPERATIVE IMAGES USING BIOMECHANICAL MODEL SIMULATIONS

(71) Applicants: Ozan Oktay, Monmouth Junction, NJ (US); Li Zhang, Skillman, NJ (US)

(72) Inventors: Ozan Oktay, Monmouth Junction, NJ (US); Li Zhang, Skillman, NJ (US)

(73) Assignee: Siemens Healthcare GmbH, Erlangen (DE)

( * ) Notice: Subject to any disclaimer, the term of this patent is extended or adjusted under 35 U.S.C. 154(b) by 350 days.

(21) Appl. No.: 14/078,002

(22) Filed: Nov. 12, 2013

(65) Prior Publication Data

US 2014/0133727 A1    May 15, 2014

Related U.S. Application Data

(60) Provisional application No. 61/726,687, filed on Nov. 15, 2012.

(51) Int. Cl.
*G06T 7/00* (2017.01)
*G06T 7/33* (2017.01)

(52) U.S. Cl.
CPC ...... *G06T 7/33* (2017.01); *G06T 2207/10081* (2013.01); *G06T 2207/30028* (2013.01); *G06T 2207/30056* (2013.01)

(58) Field of Classification Search
CPC ... G06T 7/0014; G06T 7/0022; G06T 7/0032; G06T 7/0046; G06T 7/0065
See application file for complete search history.

(56) References Cited

U.S. PATENT DOCUMENTS

| | | | |
|---|---|---|---|
| 6,584,339 B2 * | 6/2003 | Galloway et al. | 600/426 |
| 8,489,368 B2 * | 7/2013 | Klimmek | 703/2 |
| 2008/0123927 A1 * | 5/2008 | Miga et al. | 382/131 |
| 2011/0044521 A1 * | 2/2011 | Tewfik et al. | 382/131 |
| 2012/0155734 A1 * | 6/2012 | Barratt et al. | 382/131 |

OTHER PUBLICATIONS

Kitasaka, Takayuki, Mori, Kensaku, Hayashi, Yuichiro, Suenaga, Yashuhito, Hashizume, Makoto, Toriwaki, Jun-ichiro. "Virtual Pneumoperitoneum for Generating Virtual Laparoscopic Views Based on Volumetric Deformation". MICCAI 2004, LNCS3217 pp. 559-567.*

Chefd'hotel, C., Hermosillo, G., Faugeras, O. "Flows of Diffeomorphisms for Multimodal Image Registration". IEEE 2002.*

Bano, J., Hostettler, A., Nicolau, S.A., Cotin, S. Doignon, C., Wu, H.S, Huang, M.H., Soler, L., Marescaux, J. "Simulation of Pneumperitoneum for Laparoscopic Surgery Planning". MICCAI 2012. Oct. 2012.*

* cited by examiner

*Primary Examiner* — Kim Vu
*Assistant Examiner* — Molly Delaney

(57) ABSTRACT

A method and system for registering pre-operative images and intra-operative images using biomechanical simulations is disclosed. A pre-operative image is initially registered to an intra-operative image by estimating deformations of one or more segmented anatomical structures in the pre-operative image, such as the liver, surrounding tissue, and the abdominal wall, using biomechanical gas insufflation model constrained. The initially registered pre-operative image is then refined using diffeomorphic non-rigid refinement.

27 Claims, 6 Drawing Sheets

FIG. 3
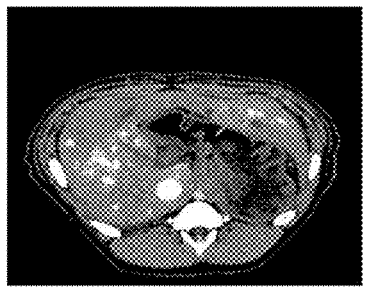
300
310
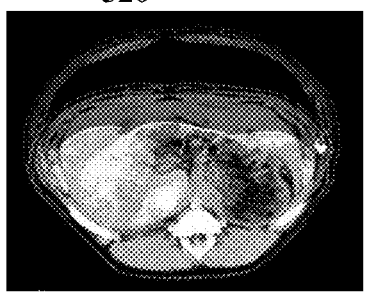
320
330
340

FIG. 5

| | Algorithm 1 Insufflation model constrained registration |
|---|---|
| | 1: Problem: maximize $D^{LCC}[\mathbf{R}, \mathbf{M} \circ \Psi_{\alpha^{(i)}}]$ |
| | 2: define Young's Mod.: $k_j$, Poisson's ratio: $E_j$, Pressure: $P_{gas}$ $\forall j \in \mathbb{N} : j < N$ |
| 502 → | 3: initialize $\alpha^{(0)} = [k_0, \ldots, k_{N-1}, E_0, \ldots, E_{N-1}, P_{gas}]$, $\alpha_i \in \mathbb{R}$, $\forall i \in \mathbb{N} : i < L$ |
| | 4: while $\|\nabla D^{LCC}_{\alpha^{(i)}}\| \geq$ Threshold do |
| 504 → | 5:   compute $\Psi_{\alpha^{(i)}} = F(\alpha^{(i)}, \mathbf{M})$ |
| 506 → | 6:   compute $D^{LCC}[\mathbf{R}, \mathbf{M} \circ \Psi_{\alpha^{(i)}}]$ |
| 508 → | 7:   compute $\partial D^{LCC}_{\alpha^{(i)}_j} = \left(D^{LCC}[\mathbf{R}, \mathbf{M}; \alpha^{(i)} + \beta_j] - D^{LCC}[\mathbf{R}, \mathbf{M}; \alpha^{(i)}]\right) / \|\beta_j\|$ |
| 510 → | 8:   update $\alpha^{(i+1)}_j = \alpha^{(i)}_j + \gamma \cdot \partial D^{LCC}_{\alpha^{(i)}_j}$ |
| | 9: end while |
| 512 → | 10: return $(\mathbf{M} \circ \Psi_{\alpha^{(i+1)}})$ |

SYSTEM AND METHOD FOR REGISTERING PRE-OPERATIVE AND INTRA-OPERATIVE IMAGES USING BIOMECHANICAL MODEL SIMULATIONS

This application claims the benefit of U.S. Provisional Application No. 61/726,687, filed Nov. 15, 2012, the disclosure of which is herein incorporated by reference.

BACKGROUND OF THE INVENTION

The present invention relates to registration of pre-operative and intra-operative images for laparoscopic surgery, and more particularly to registration of pre-operative and intra-operative images of a target organ using biomechanical model simulations.

Laparoscopic surgery is a minimally invasive procedure that is widely used for treatment of cancer and other diseases. Advantages, such as reduced post-operative pain and shorter recovery time, make laparoscopic surgery preferable to open surgery. During laparoscopic surgery, organ surfaces can only be viewed through laparoscopic images and it is difficult to visualize sub-surface tumors. Accordingly, intra-operative three dimensional (3D) images can be introduced to provide updated information during the laparoscopic surgery. While, the intra-operative images typically have limited image information due to constraints imposed in operating rooms, pre-operative images can provide supplementary anatomical functional details and accurate segmentation of organs, vessels, and tumors. In order to bridge the gap between surgical plans and laparoscopic images, registration of pre-operative and intra-operative 3D images is desirable to guide real time navigation. However, such registration is challenging due to gas insufflation and other surgical preparation, which can result in large organ deformation and sliding between the viscera and abdominal wall. Thus, standard non-rigid image registration techniques do not provide accurate results.

BRIEF SUMMARY OF THE INVENTION

The present invention provides a method and system for registering pre-operative and intra-operative images of a target organ. Embodiments of the present invention provide a method for accurate registration of pre-operative and intra-operative images driven by biomechanical modeling of abdomen deformation under gas insufflation. Embodiments of the present invention achieve coupling between the registration and insufflation model by optimizing an intensity similarity measure between the modeled pre-operative image and the intra-operative image. Embodiments of the present invention optimize biomechanical parameters to estimate an insufflation model with patient-specific biomechanical parameters.

In one embodiment of the present invention, an initially registered pre-operative image is generated by estimating deformations of one or more segmented anatomical structures in a pre-operative image using biomechanical gas insufflation model constrained registration with the intra-operative image. The initially registered pre-operative image is refined using diffeomorphic non-rigid refinement.

These and other advantages of the invention will be apparent to those of ordinary skill in the art by reference to the following detailed description and the accompanying drawings.

BRIEF DESCRIPTION OF THE DRAWINGS

FIG. 3 illustrates exemplary results of the method steps of FIG. 2;

FIG. 5 is pseudo-code illustrating an algorithm for implementing gas insufflation constrained registration according to an embodiment of the present invention.

DETAILED DESCRIPTION

The present invention relates to registration of pre-operative and intra-operative images of a target organ using biomechanical model simulations. Embodiments of the present invention are described herein to give a visual understanding of the methods for registering pre-operative and post-operative images using biomechanical model simulations. A digital image is often composed of digital representations of one or more objects (or shapes). The digital representation of an object is often described herein in terms of identifying and manipulating the objects. Such manipulations are virtual manipulations accomplished in the memory or other circuitry/hardware of a computer system. Accordingly, is to be understood that embodiments of the present invention may be performed within a computer system using data stored within the computer system.

Figure 1:
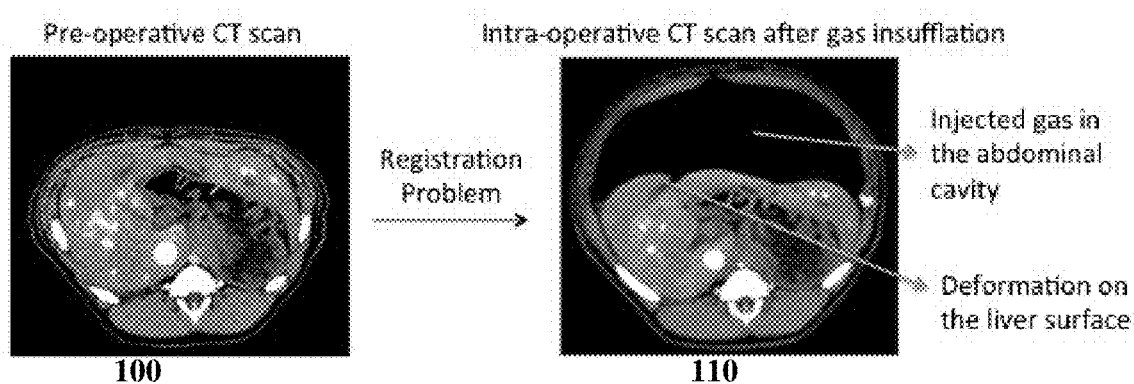
FIG. 1 illustrates a registration problem between a pre-operative CT scan and an intra-operative CT scan after gas insufflation.

Laparoscopic surgery is a minimally invasive procedure that is widely used for treatment of cancer and other diseases. During the procedure, gas insufflation is used to provide space for laparoscopic imaging and operation. The gas insufflation causes large deformations to the thoracic abdominal wall and viscera. Due to these large deformations, the benefit of surgical plans, which are typically based on pre-operative images, is limited for real time navigation. Intra-operative images, such as cone-beam computed tomography (CT) images or interventional CT images, can be used to provide updated volumetric information after insufflation. However, registration of the pre-operative images to the intra-operative images is challenging due to the deformations caused by the gas insufflation. FIG. 1 illustrates a registration problem between a pre-operative CT scan and an intra-operative CT scan after gas insufflation. As illustrated in FIG. 1, image 100 is a pre-operative CT scan and image 110 is an intra-operative CT scan of the same patient after gas insufflation. As shown in image 110, gas is injected into the abdominal cavity, which causes large deformations on the liver surface. Due to such large deformation standard registration methods fail to achieve accurate structure alignment between the pre-operative and intra-operative images.

Figure 2:
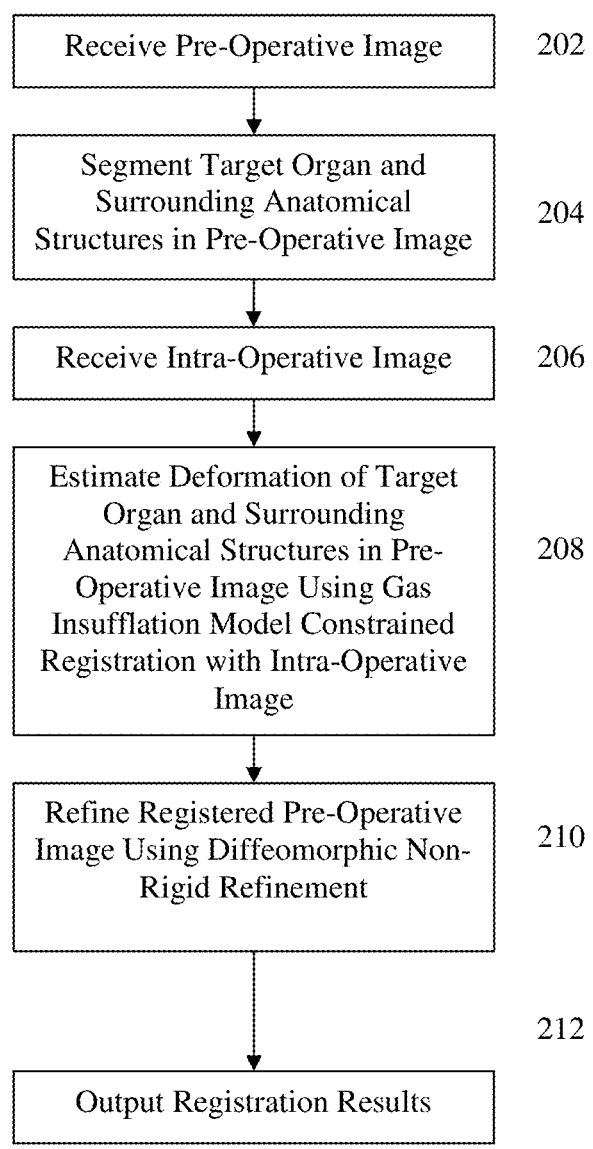
FIG. 2 illustrates a method of registering a pre-operative image and an intra-operative image of a target organ of a patient according to an embodiment of the present invention.

FIG. 2 illustrates a method of registering a pre-operative image and an intra-operative image of a target organ of a patient according to an embodiment of the present invention. Although the method of FIG. 2 is described here using the liver as the target organ, the present invention is not limited there, and embodiments of the present invention may be similarly applied to other organs as well, such as the gall bladder. The method of FIG. 2 transforms image data representing a patient's anatomy to register or align pre-operative image data with intra-operative image data in order to provide real time navigation for laparoscopic procedures.

Referring to FIG. 2, at step 202, a pre-operative image of a patient is received. The pre-operative image is a medical image of at least a portion of the patient's anatomy including a target organ, such as the liver. In an advantageous implementation, the pre-operative image is a 3D medical image. For example, the pre-operative image may be a 3D CT image, but the present invention is not limited thereto, and the pre-operative image may be acquired using other imaging modalities as well, such as magnetic resonance imaging (MRI), positron emission topography (PET), ultrasound, etc. The pre-operative image may be received directly from an image acquisition device, such as a CT scanner, or the pre-operative image may be received by loading a previously stored image from a memory or storage of a computer system. FIG. 3 illustrates exemplary results of the method steps of FIG. 2. As shown in FIG. 3, image 300 is a pre-operative CT image of a thoracic region of a patient.

Returning to FIG. 2, at step 204, the target organ and surrounding anatomical structures are segmented in the pre-operative image. For example, the liver can be segmented in the pre-operative image, and other anatomical structures, such as the abdomen wall, other organs, bones, and other surrounding tissues can be segmented as well. In one embodiment, the target organ and other anatomic structures can be semi-automatically segmented in the pre-operative image using a graph theory approach, such as random walker segmentation. For each structure, the user defines seeds inside and outside the area of interest. Then, the random-walker algorithm automatically estimates the boundary of the structure. The process may be refined by the user, interactively, if necessary. It is also possible that fully automatic segmentation, such as marginal space learning (MSL) based segmentation, or manual segmentation be used to segment the target organ and surrounding structures. Tetrahedral mesh elements are generated for each of the segmented structures, for example using the Computational Geometry Algorithms Library (CGAL), resulting in a tetrahedral mesh for each segmented structure. The surface points of these volume meshes are tagged automatically, which are then used to apply the insufflated gas pressure in step 208. Alternatively, the resulting segmentations may be merged into a multi-label mask image, which is then used to generate a tetrahedral multi-domain mesh. In an exemplary embodiment, the pre-operative image is segmented as the liver, abdominal wall, and surrounding tissue.

Figure 4:
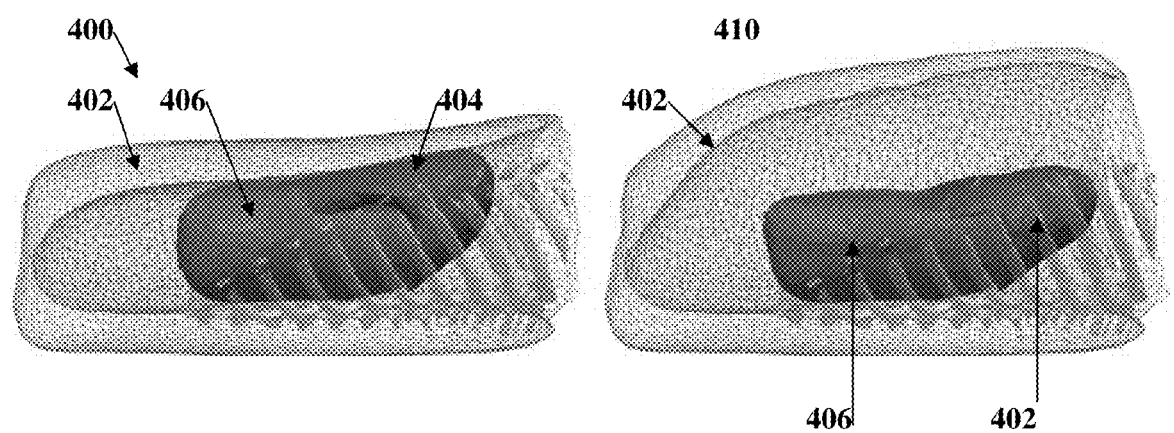
FIG. 4 illustrates an exemplary mesh generated for segmented anatomic structures in a pre-operative image.

FIG. 4 illustrates an exemplary mesh generated for segmented anatomic structures in a pre-operative image. As shown in FIG. 4, image 400 shows the initial mesh, including the abdominal wall 402, liver 404, and surrounding tissue 406, as segmented from the pre-operative image. Image 410 shows the mesh, including the abdominal wall 402, liver 404, and surrounding tissue 406, after being deformed to be registered to an intra-operative image acquired after gas insufflation.

Steps 202 and 204 of FIG. 2 may be performed in advance of a laparoscopic procedure, and the results of these steps may be stored, for example on a memory or storage device of a computer system, and then loaded during the laparoscopic procedure. Steps 206-212 are performed during the laparoscopic procedure.

At step 206, an intra-operative image of the patient is received. The intra-operative image is a medical image of at least a region including the target organ that is acquired during a procedure, such as a laparoscopic procedure after gas insufflation (i.e., after the gas has been injected into the abdominal cavity). According to an advantageous implementation, the intra-operative image may be a 3D medical image. For example, the intra-operative image may be a 3D C-arm cone beam CT image or other type of interventional CT image. The intra-operative image may be received directly from an image acquisition device, such as a C-arm image acquisition device. As shown in FIG. 3, image 310 is an intra-operative CT image of a thoracic region of a patient.

Returning to FIG. 2, at step 208, deformation of the segmented target organ and surrounding anatomical structures in the pre-operative image is estimated using gas insufflation model constrained registration with the intra-operative image. This step computes the deformations and organ shifts caused by gas pressure, using a biomechanical model of gas insufflation, which is based on mechanical parameters and pressure levels. This gas insufflation model is applied to the pre-operative image to achieve an initial alignment with the intra-operative image, which accounts for both non-rigid and rigid transformations caused by the insufflation. To incorporate this biomechanical gas insufflation model into a registration framework, the model parameters are coupled with an intensity similarity measure, which is used to tune the model parameters so they are patient-specific.

The pre-operative image and the intra-operative image are initially rigidly aligned using the spine position in the images. As shown in FIG. 3, image 320 shows the initial alignment of the pre-operative image 300 and the intra-operative image 310 using the spine position. The registration is then implemented using an optimization problem formulated as follows:

$$\max D^{LCC}(R, \Psi_{diffeo} \circ \Psi_{mod\ el} \circ M), \quad (1)$$

where M and R denote the moving (pre-operative) and reference (intra-operative) 3D images, respectively, $D^{LCC}$ is a local cross correlation intensity similarity measure, $\Psi_{mod\ el}$ is the deformation field due to the gas insufflation model guide registration (step 208 of FIG. 2), and $\Psi_{diffeo}$ is the deformation due to the non-rigid diffeomorphic refinement (step 210).

The biomechanical gas insufflation model deforms mesh elements and computes the displacement of mesh points. In an advantageous embodiment, the liver, abdominal wall, and surrounding tissues segmented in the pre-operative image, and tetrahedral mesh elements are generated for each of these structures (see FIG. 4). The surface points of these volume meshes are tagged automatically, and these mesh points are used to apply the gas pressure.

The corotational finite element method is used with a linear elastic model to compute the displacement of the organs under abdominal gas pressure. An implicit time discretization is employed for unconditional stability. As a solution method, dynamic modeling can be used to cope with inertia effects and organ collisions. The mechanical system with the abdominal wall, liver and surrounding tissues is deformed under the external pressure generated in the abdominal cavity, which represents the insufflated gas. Image 410 of FIG. 4 shows the mesh, including the abdominal wall 402, liver 404, and surrounding tissue 406 mesh elements, deformed under the pressure representing the insufflated gas. The applied force field together with the internal tissue properties deform the meshes while preserving the mesh topology. Then force, acceleration, and displacement field for each mesh node are integrated and computed in an iterative approach.

The partial differential equation for the biomechanical gas insufflation model can be expressed as:

$$M\ddot{u}+D\dot{u}+Ku=F_{gas}. \qquad (2)$$

When the model achieves stability, the gas pressure forces ($F_{gas}$) are balanced with internal mesh stiffness forces, and the final node positions (u) are determined. The parameters M, D, and K represent the mass, damping, and stiffness matrices. In an advantageous implementation, the model parameters are the gas pressure, Poisson's ratio, and Young's modulus for each tissue. The initial parameter values can be set according to the literature, and the gas pressure value is collected during surgery. The simulation framework may be implemented in the SOFA library, but the present invention is not limited thereto.

The biomechanical gas insufflation model is combined with an intensity similarity measure to include the model in the registration framework. In this regard, the model parameters are updated iteratively until model convergence by optimizing the intensity similarity between the intra-operative and model-updated pre-operative images. The deformation field obtained from the biomechanical model is used to re-compute the pre-operative image that uses a backward thin-plate spline interpolation method. The algorithm can be described as follows: let the model deformations $\Psi_{mod\ el}$: $\Re^3 \to \Re^3$ and mechanical parameter set $\alpha^{(t)} \in \Re^L$ be denoted by $\Psi_{\alpha^{(t)}}$. The superscript t is the discrete time step, and $L \in N$ is the number of parameters. The similarity measure is maximized using a gradient ascent approach, which updates the model parameter values.

FIG. 5 is pseudo-code illustrating an algorithm for implementing gas insufflation constrained registration according to an embodiment of the present invention. The algorithm of FIG. 5 can be used to implement step 208 of FIG. 2. It is to be understood that, before the algorithm of FIG. 5 is implemented, the pre-operative and intra-operative images can be initially aligned based on the spine positions in the respective images. In FIG. 5, R denotes the reference (intra-operative) image, M denotes the moving (pre-operative) image, N is the number of mesh elements, β is the parameter increment, and γ is a constant gradient step. Referring to FIG. 5, at 502, the initial parameters of the biomechanical gas insufflation model are initialized. The initial values for Poisson's ratio and Young's modulus at each mesh point can be initialized using the literature, e.g., as average values. The gas pressure is initialized based on the measured gas pressure in the surgery. At 504, the deformation at each mesh point in the pre-operative image is calculated using the biomechanical gas insufflation model $F(\alpha^{(t)},M)$ with the current parameters. At 506, the pre-operative image is warped based on the calculated deformations and the intensity similarity measure ($D^{LCC}$) between the intra-operative image (R) and the warped pre-operative image ($M \circ \Psi_{\alpha^{(t)}}$) is calculated. In an advantageous implementation, the intensity similarity measure ($D^{LCC}$) is a local cross correlation intensity similarity measure. At 508, the gradient of the intensity similarity measure is calculated. The gradient of the intensity similarity measure $$\frac{\partial D^{LCC}_{\alpha(t)}}{\partial_t}$$

is statistically calculated using the equation shown in FIG. 5 to increase the intensity similarity measure. At 510, the parameters of the biomechanical gas insufflation model are updated based on the gradient of the intensity similarity measure. The algorithm of FIG. 5, repeats operations 504-510 until the intensity similarity measure converges (e.g., until the change in intensity similarity measure between successive steps is less than a threshold). Accordingly, once the parameters of the biomechanical gas insufflation model are updated, the deformations are the calculated using the gas insufflation model with the updated parameters, and the intensity similarity measure is re-calculated. These operations are repeated until the biomechanical model parameters result in deformations of the segmented anatomical structures in the pre-operative image that best match the intra-operative image. At 512, the pre-operative image is warped using the deformation field calculated using the biomechanical gas insufflation model with from the final updated parameters and the warped pre-operative image $M \circ \Psi_{\alpha^{(t+1)}}$ is returned. As shown in FIG. 3, image 330 shows an initial registration of the pre-operative image 300 to the intra-operative image 310 using gas insufflation model constrained registration.

Returning to FIG. 2, at step 210, the initially registered pre-operative image is refined using diffeomorphic non-rigid refinement to warp the initially registered pre-operative image to the intra-operative image. Compared to the complexity of the human body, the biomechanical model of gas insufflation used in step 208 is not able to formulate all of the deformations that occur during surgery. Therefore, as a refinement process, the model based registered image is warped to the intra-operative image using diffeomorphic non-rigid registration. Diffeomorphic non-rigid registration is a dense matching method driven by the gradient of the local cross correlation intensity similarity measure. Gaussian smoothing regularization is applied on time-dependent velocity fields and their composition is used to estimate deformations. This refinement is designed to achieve highly accurate structure alignment, particularly on the liver surface.

At step 212, the registration results are output. For example, the registered pre-operative image alone or overlayed with the intra-operative image may be displayed on a display of a computer system. The registered pre-operative image may be displayed in an operating room during a surgical procedure, such as a laparoscopic procedure, to provide real-time navigation during the procedure. As shown in FIG. 3, image 340 shows the final registration result for registering the pre-operative image 300 to the intra-operative image 310 using the method of FIG. 2.

Figure 6:
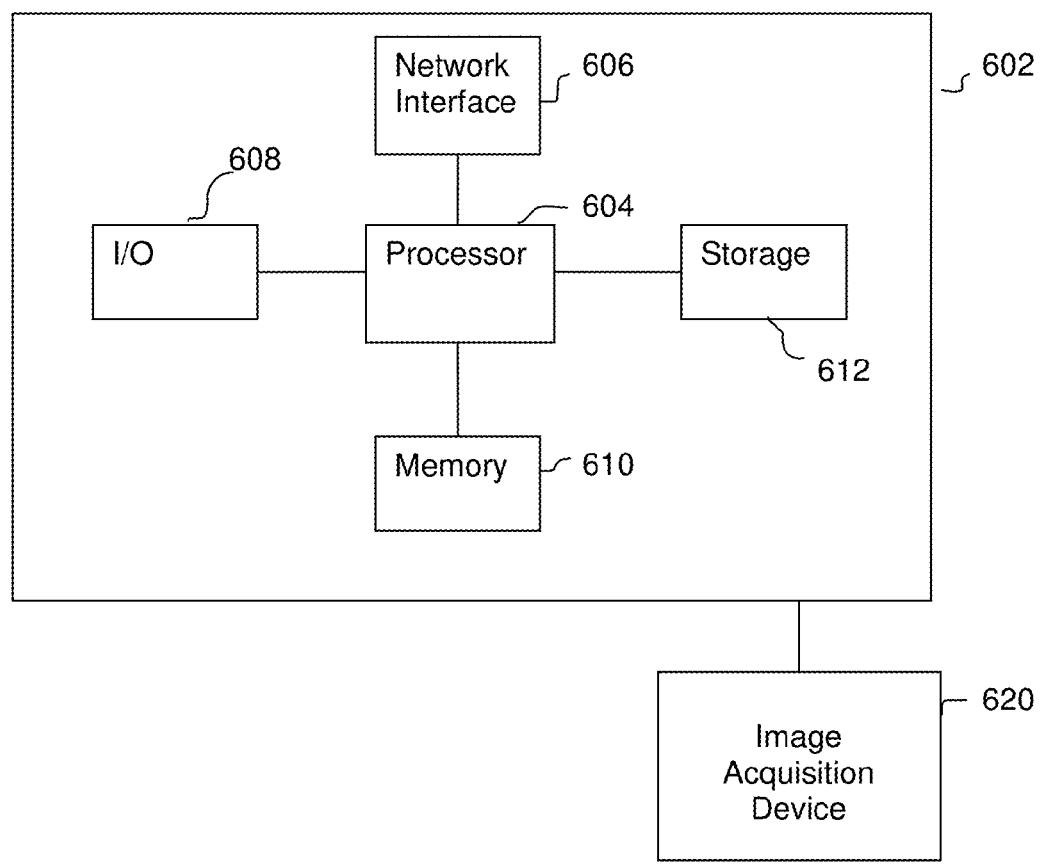
FIG. 6 is a high-level block diagram of a computer capable of implementing the present invention.

The above-described methods for registration of pre-operative and intra-operative images can be implemented on a computer using well-known computer processors, memory units, storage devices, computer software, and other components. A high-level block diagram of such a computer is illustrated in FIG. 6. Computer 602 contains a processor 604, which controls the overall operation of the computer 602 by executing computer program instructions which define such operation. The computer program instructions may be stored in a storage device 612 (e.g., magnetic disk) and loaded into memory 610 when execution of the computer program instructions is desired. Thus, the steps of the methods of FIGS. 1 and 5 may be defined by the computer program instructions stored in the memory 610 and/or storage 612 and controlled by the processor 604 executing the computer program instructions. An image acquisition device 620, such as a CT scanning device, C-arm image acquisition device, MR scanning device, Ultrasound device, etc., can be connected to the computer 602 to input image data to the computer 602. It is possible to implement the image acquisition device 620 and the computer 602 as one device. It is also possible that the image acquisition device 620 and the computer 602 communicate wirelessly through a network. The computer 602 also includes one or more network interfaces 606 for communicating with other devices via a network. The computer 602 also includes other input/output devices 608 that enable user interaction with the computer 602 (e.g., display, keyboard, mouse, speakers, buttons, etc.). Such input/output devices 608 may be used in conjunction with a set of computer programs as an annotation tool to annotate volumes received from the image acquisition device 620. One skilled in the art will recognize that an implementation of an actual computer could contain other components as well, and that FIG. 6 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for registering a pre-operative image of a patient to an intra-operative image of the patient, comprising:
   generating an initially registered pre-operative image by estimating deformations of one or more segmented anatomical structures in the pre-operative image using biomechanical gas insufflation model constrained registration with the intra-operative image; and
   refining the initially registered pre-operative image using diffeomorphic non-rigid refinement.

2. The method of claim 1, further comprising:
   segmenting the one or more anatomical structures in the pre-operative image.

3. The method of claim 1, wherein the one or more segmented anatomical structures comprise a target organ and one or more surrounding anatomical structures.

4. The method of claim 1, wherein the one or more segmented anatomical structures comprise an abdomen wall, a liver, and tissue surrounding the liver.

5. The method of claim 1, wherein generating an initially registered pre-operative image by estimating deformations of one or more segmented anatomical structures in the pre-operative image using biomechanical gas insufflation model constrained registration with the intra-operative image comprises:
   (a) calculating deformations of the one or more segmented anatomical structures using a biomechanical gas insufflation model;
   (b) generating a warped pre-operative image based on the calculated deformations of the one or more segmented anatomical structures;
   (c) calculating an intensity similarity measure between the intra-operative image and the warped pre-operative image;
   (d) updating parameters of the biomechanical gas insufflation model based on a gradient of the intensity similarity measure; and
   (e) repeating steps (a)-(d) until convergence of the intensity similarity measure or the parameters of the biomechanical gas insufflation model.

6. The method of claim 5, wherein the one or more segmented anatomical structures comprise a tetrahedral mesh of the one or more segmented anatomical structures, and calculating deformations of the one or more segmented anatomical structures using a biomechanical gas insufflation model comprises:
   calculating a deformation at each of a plurality of mesh points of the tetrahedral mesh.

7. The method of claim 5, wherein the parameters of the biomechanical gas insufflation model include Young's modulus, Poisson's ratio, and a gas pressure at each of the mesh points of the tetrahedral mesh.

8. The method of claim 5, wherein the intensity similarity measure is a local cross correlation intensity similarity measure.

9. The method of claim 1, wherein refining the initially registered pre-operative image using diffeomorphic non-rigid refinement comprises:
   warping the initially registered pre-operative image to the intra-operative image using diffeomorphic non-rigid refinement.

10. An apparatus for registering a pre-operative image of a patient to an intra-operative image of the patient, comprising:
    means for generating an initially registered pre-operative image by estimating deformations of one or more segmented anatomical structures in the pre-operative image using biomechanical gas insufflation model constrained registration with the intra-operative image; and
    means for refining the initially registered pre-operative image using diffeomorphic non-rigid refinement.

11. The apparatus of claim 10, further comprising:
    means for segmenting the one or more anatomical structures in the pre-operative image.

12. The apparatus of claim 10, wherein the one or more segmented anatomical structures comprise a target organ and one or more surrounding anatomical structures.

13. The apparatus of claim 10, wherein the one or more segmented anatomical structures comprise an abdomen wall, a liver, and tissue surrounding the liver.

14. The apparatus of claim 10, wherein the means for generating an initially registered pre-operative image by estimating deformations of one or more segmented anatomical structures in the pre-operative image using biomechanical gas insufflation model constrained registration with the intra-operative image comprises:
    means for calculating deformations of the one or more segmented anatomical structures using a biomechanical gas insufflation model;
    means for generating a warped pre-operative image based on the calculated deformations of the one or more segmented anatomical structures;
    means for calculating an intensity similarity measure between the intra-operative image and the warped pre-operative image; and
    means for updating parameters of the biomechanical gas insufflation model based on a gradient of the intensity similarity measure.

15. The apparatus of claim 14, wherein the one or more segmented anatomical structures comprise a tetrahedral mesh of the one or more segmented anatomical structures, and the means for calculating deformations of the one or more segmented anatomical structures using a biomechanical gas insufflation model comprises:

means for calculating a deformation at each of a plurality of mesh points of the tetrahedral mesh.

16. The apparatus of claim 15, wherein the parameters of the biomechanical gas insufflation model include Young's modulus, Poisson's ratio, and a gas pressure at each of the mesh points of the tetrahedral mesh.

17. The apparatus of claim 14, wherein the intensity similarity measure is a local cross correlation intensity similarity measure.

18. The apparatus of claim 10, wherein the means for refining the initially registered pre-operative image using diffeomorphic non-rigid refinement comprises:
means for warping the initially registered pre-operative image to the intra-operative image using diffeomorphic non-rigid refinement.

19. A non-transitory computer readable medium storing computer program instructions for registering a pre-operative image of a patient to an intra-operative image of the patient, the computer program instructions when executed by a processor cause the processor to perform operations comprising:
generating an initially registered pre-operative image by estimating deformations of one or more segmented anatomical structures in the pre-operative image using biomechanical gas insufflation model constrained registration with the intra-operative image; and
refining the initially registered pre-operative image using diffeomorphic non-rigid refinement.

20. The non-transitory computer readable medium of claim 19, the operations further comprising:
segmenting the one or more anatomical structures in the pre-operative image.

21. The non-transitory computer readable medium of claim 19, wherein the one or more segmented anatomical structures comprise a target organ and one or more surrounding anatomical structures.

22. The non-transitory computer readable medium of claim 19, wherein the one or more segmented anatomical structures comprise an abdomen wall, a liver, and tissue surrounding the liver.

23. The non-transitory computer readable medium of claim 19, wherein generating an initially registered pre-operative image by estimating deformations of one or more segmented anatomical structures in the pre-operative image using biomechanical gas insufflation model constrained registration with the intra-operative image comprises:
(a) calculating deformations of the one or more segmented anatomical structures using a biomechanical gas insufflation model;
(b) generating a warped pre-operative image based on the calculated deformations of the one or more segmented anatomical structures;
(c) calculating an intensity similarity measure between the intra-operative image and the warped pre-operative image;
(d) updating parameters of the biomechanical gas insufflation model based on a gradient of the intensity similarity measure; and
(e) repeating steps (a)-(d) until convergence of the intensity similarity measure or the parameters of the biomechanical gas insufflation model.

24. The non-transitory computer readable medium of claim 23, wherein the one or more segmented anatomical structures comprise a tetrahedral mesh of the one or more segmented anatomical structures, and calculating deformations of the one or more segmented anatomical structures using a biomechanical gas insufflation model comprises:
calculating a deformation at each of a plurality of mesh points of the tetrahedral mesh.

25. The non-transitory computer readable medium of claim 24, wherein the parameters of the biomechanical gas insufflation model include Young's modulus, Poisson's ratio, and a gas pressure at each of the mesh points of the tetrahedral mesh.

26. The non-transitory computer readable medium of claim 23, wherein the intensity similarity measure is a local cross correlation intensity similarity measure.

27. The non-transitory computer readable medium of claim 19, wherein refining the initially registered pre-operative image using diffeomorphic non-rigid refinement comprises:
warping the initially registered pre-operative image to the intra-operative image using diffeomorphic non-rigid refinement.

* * * * *